(12) United States Patent
Wang et al.

(10) Patent No.: US 8,271,311 B2
(45) Date of Patent: Sep. 18, 2012

(54) SYSTEM AND METHOD FOR RESOURCE ALLOCATION OF SEMICONDUCTOR TESTING INDUSTRY

(75) Inventors: Kung-Jeng Wang, Taipei County (TW); Shih-Min Wang, Taipei County (TW)

(73) Assignee: National Taiwan University of Science and Technology, Taipei (TW)

( * ) Notice: Subject to any disclaimer, the term of this patent is extended or adjusted under 35 U.S.C. 154(b) by 520 days.

(21) Appl. No.: 12/545,050

(22) Filed: Aug. 20, 2009

(65) Prior Publication Data
US 2010/0185480 A1 Jul. 22, 2010

(30) Foreign Application Priority Data
Jan. 17, 2009 (TW) ................................ 98101787 A

(51) Int. Cl.
*G06Q 10/00* (2012.01)
(52) U.S. Cl. ............... 705/7.11; 705/7.12; 705/7.22; 705/7.23; 702/20; 700/96; 706/13
(58) Field of Classification Search ........ 705/7.11–7.12, 705/7.22–7.23; 702/20; 700/96; 706/13
See application file for complete search history.

(56) References Cited

U.S. PATENT DOCUMENTS

| | | | | |
|---|---|---|---|---|
| 5,311,438 A | * | 5/1994 | Sellers et al. | 700/96 |
| 5,319,781 A | * | 6/1994 | Syswerda | 705/7.25 |
| 5,630,070 A | * | 5/1997 | Dietrich et al. | 705/7.23 |
| 5,651,098 A | * | 7/1997 | Inoue et al. | 706/13 |
| 5,848,403 A | * | 12/1998 | Gabriner et al. | 706/13 |
| 5,946,212 A | * | 8/1999 | Bermon et al. | 700/97 |
| 6,219,649 B1 | * | 4/2001 | Jameson | 705/7.12 |
| 6,233,493 B1 | * | 5/2001 | Cherneff et al. | 700/95 |
| 6,341,240 B1 | * | 1/2002 | Bermon et al. | 700/97 |
| 6,529,792 B1 | * | 3/2003 | Sato et al. | 700/121 |
| 6,965,867 B1 | * | 11/2005 | Jameson | 705/7.12 |
| 6,988,076 B2 | * | 1/2006 | Ouimet | 705/7.36 |
| 7,139,719 B1 | * | 11/2006 | Cherneff et al. | 705/7.23 |
| 7,357,298 B2 | * | 4/2008 | Pokorny et al. | 235/375 |
| 7,363,280 B2 | * | 4/2008 | Jin et al. | 706/13 |
| 2002/0120407 A1 | * | 8/2002 | Stevens | 702/20 |
| 2003/0050902 A1 | * | 3/2003 | Buczak et al. | 706/13 |

FOREIGN PATENT DOCUMENTS

| | | |
|---|---|---|
| TW | 526529 | 4/2003 |
| TW | 556097 | 10/2003 |
| TW | 589554 | 6/2004 |
| TW | 594842 | 6/2004 |
| TW | I226006 | 1/2005 |
| TW | I228674 | 3/2005 |

OTHER PUBLICATIONS

Wang et al. (K.-J. Wang, S.-M. Wang, S.-J. Yang "A resource portfolio model for equipment investment and allocation of semiconductor testing industry" European Journal of Operational Research 179 (2007) 390-403) discloses genetic algorithms for determining equipment investment alternatives.*

* cited by examiner

*Primary Examiner* — Lynda Jasmin
*Assistant Examiner* — Alan S Miller
(74) *Attorney, Agent, or Firm* — Jianq Chyun IP Office

(57) ABSTRACT

A system and a method for resource allocation in the semiconductor testing industry are provided. In the system, an industry characteristic conversion module is used to transform the industry characteristic obtained from an input module into a chromosome structure. Next, an artificial intelligence evolution module proceeds to find an optimal solution by handling the chromosome structure until a candidate solution having a maximum final total profit converges to a value.

18 Claims, 3 Drawing Sheets

SYSTEM AND METHOD FOR RESOURCE ALLOCATION OF SEMICONDUCTOR TESTING INDUSTRY

CROSS-REFERENCE TO RELATED APPLICATION

This application claims the priority benefit of Taiwan application serial no. 98101787, filed on Jan. 17, 2009. The entirety of the above-mentioned patent application is hereby incorporated by reference herein and made a part of specification.

BACKGROUND OF THE INVENTION

1. Field of the Invention

The present invention relates to a system and a method for planning and allocating resources in the semiconductor testing industry, and particularly to a system and a method for resource allocation in the semiconductor testing industry in a multiple resource environment.

2. Description of Related Art

Due to increasing competition between firms, based on market prediction, semiconductor testing firms must effectively perform resource planning, capacity allocation, profit allocation, and resource purchasing to allocate capacity to orders/semiconductor chips of customers, so that the profits and the resources can be employed most effectively. Conventional resource planning and capacity allocation of a semiconductor testing firm is mostly performed using spreadsheet software in cooperation with practical experiences. However, the orders to be tested and the required resource are complex combined resources (e.g., an order may simultaneously require a testing system, a handler and other machinery), which often lead to confliction, delay and waste among the resources. In addition, there are many possible channels for purchasing the resources.

On the other hand, conventional resource planning and the capacity allocation are executed separately by two departments with different functions, i.e. a resource planning department and a production control department in the firm. Hence, if optimal resource planning and capacity allocation cannot be simultaneously achieved, thereby possibly leading to losses in millions of dollars. A conventional method for resource planning and capacity allocation is time consuming, and many what-if analyses cannot be easily performed in a short time. There is also a lack of methods to precisely describe operational characteristics in the semiconductor testing industry (e.g. factors such as fabrication feasibility between resources, production feasibility between orders and resources and constraints on production capacity of resources).

SUMMARY OF THE INVENTION

The present invention provides a system and a method for the semiconductor testing industry to efficiently develop resource planning and capacity allocation in a multiple resource environment.

The present invention provides a system for resource allocation in the semiconductor testing industry. The system includes an input module, an industry characteristic conversion module, an artificial intelligence evolution module and an output module. The input module is used to receive order information of a product and production information from a manufacturer. The above production information includes multiple resources, and the order information includes a testing quantity corresponding to the products under a product testing function requirement, and the product testing function requirement is fulfilled by a primary resource in cooperation with at least one of auxiliary resources. The industry characteristic conversion module includes a problem extraction module and a chromosome conversion module. The problem extraction module is used to establish a production requirement constraint between the required testing quantity and a corresponding production quantity to each of the resources and to establish a resource configuration constraint of each of the resources. The chromosome conversion module is used to convert a resource planning and capacity allocation plan (on-hand quantity, a transferred quantity from other resource channels of each of the resources, and a production quantity) into a chromosome structure. The artificial intelligence evolution module is used to execute a genetic algorithm, so as to obtain a set of candidate solutions from the chromosome pool. Total profits of the candidate solutions are calculated accordingly, so as to find a maximum final total profit at the end of the planning horizon under consideration of time value. Each of the above candidate solutions complies with the production requirement constraint and the capacity constraint. The output module is used to output the candidate solution corresponding to the maximum final total profit.

From another point of view, the present invention provides a method for resource allocation in the semiconductor testing industry. First, the order information of the product in the semiconductor testing industry and the production information of the manufacturing department are received. The production information includes multiple resources, and the order information includes a testing quantity corresponding to the product under the testing function requirement. Note that each product testing function requirement uses at least one of the auxiliary resources in cooperation. Next, the order information and the production information are converted into the industry characteristic, so as to establish the production requirement constraint between the testing quantity and the production quantity accordingly. The resource configuration constraint of each of the resources is also established. The on-hand quantity, the transferred quantity, and the production quantity of each of the resources are converted to the chromosome structure. Next, the genetic algorithm is executed, so as to obtain a set of candidate solutions from the chromosome pool. The total profits of the candidate solutions are calculated, so as to obtain the candidate solution (plan) with the maximum final total profit at the end of the planning horizon under consideration of time value. Each of the above candidate solutions complies with the production requirement constraint and the resource configuration constraint. Last, the maximum final total profit at the end of the planning horizon is obtained, so as to obtain the candidate solution (plan) corresponding to the maximum final total profit.

According to the above, an embodiment of the present invention explains the process of executing the genetic algorithm to obtain the candidate solutions from the chromosome pool. First, the algorithm randomly obtains a set of candidate solutions. Next, whether each of the above candidate solutions complies with the production requirement constraint and the resource configuration constraint is individually evaluated. When the candidate solutions do not comply with the production requirement constraint or the resource configuration constraint, another candidate solution may be randomly selected in a feasible range of either the production requirement constraint or the resource configuration constraint, so as to be used as the candidate solution. Next, a regeneration evolution, a crossover evolution and a mutation evolution are performed on the candidate solutions, and whether the candidate solutions comply with the production requirement constraint and the resource configuration constraint is re-evaluated. The above regeneration evolution, crossover evolution and mutation evolution are performed repeatedly until the maximum final total profit corresponding to the best candidate solution converges to a value.

In light of the above, based on the order information of customers and the production information of the on-hand resources, during multiple planning periods and under conditions of multiple resources and multiple orders, the present invention readily facilitates firms on decisions concerning resource planning, the product testing function requirements, resource allocation, and order acceptance under conditions of multiple planning periods, multiple resources, and multiple products so that corporate profit is maximized. The system for resource allocation uses the information obtained by the input module and uses the industry characteristic conversion module to convert the industry characteristic into the constraints. Subsequently, the artificial intelligence evolution module performs the evolution and in cooperation with an infeasible plan repairing module, solution searching is executed more efficiently.

In order to explain objects, features and advantages of the present invention described above in more comprehensive way, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The semiconductor testing industry is a capital intensive industry. In order to effectively use costly resources of such industry (e.g. machinery equipment and human resources), the present invention provides a method and system for resource allocation in the semiconductor testing industry, so that obtainment of and configuration of the resources are well planned under multiple resource planning constraints. In order to make the present invention more comprehensible, embodiments are described below as the examples to prove that the present invention can be embodied.

Figure 1:
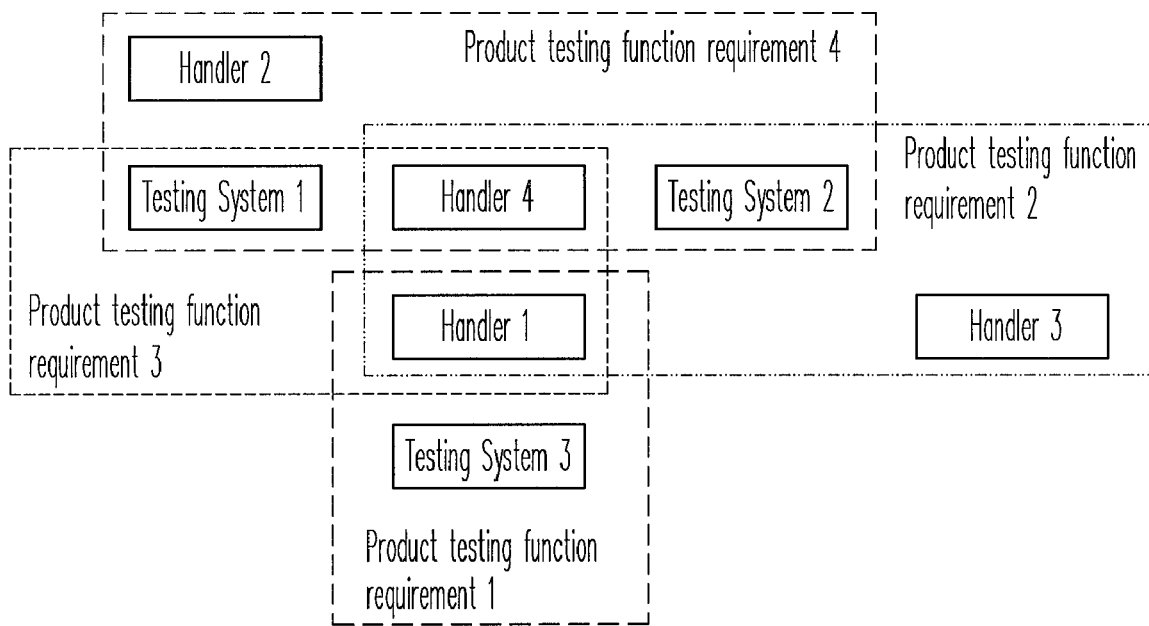
FIG. 1 is a schematic diagram showing a multiple resource environment in a semiconductor testing factory according to an embodiment of the present invention.

FIG. 1 is a schematic diagram showing a multiple resource environment in a semiconductor testing factory according to an embodiment of the present invention. Referring to FIG. 1, according to the present embodiment, the resources in the semiconductor testing factory include testing systems 1 to 3 and handlers 1 to 4. Here, product testing function requirements 1 to 4 are given by the customers. As shown in FIG. 1, the product testing function requirement 1 must be used in cooperation with the testing system 3 and the handler 1, the product testing function requirement 2 must be used in cooperation with the testing system 2 and the handler 1, 3 or 4, the product testing function requirement 3 must be used in cooperation with the testing system 1 and the handler 1 or 4, and the product testing function requirement 4 must be used in cooperation with the testing system 1 or 2 and the handler 2 or 4.

In other words, according to the order information provided by the customer, the semiconductor testing plant converts the order information into the product testing function requirements in each planning period. Fulfillment of the product testing function requirements is not only limited by the primary resources (the testing systems 1 to 3), but also limited by the required auxiliary resources (e.g., the handlers 1 to 4. Testing is only performed when both the testing systems and the auxiliary resources thereof have production capacity. In addition, when different testing systems are under the same product testing function requirement, there are also different production speeds.

Figure 2:
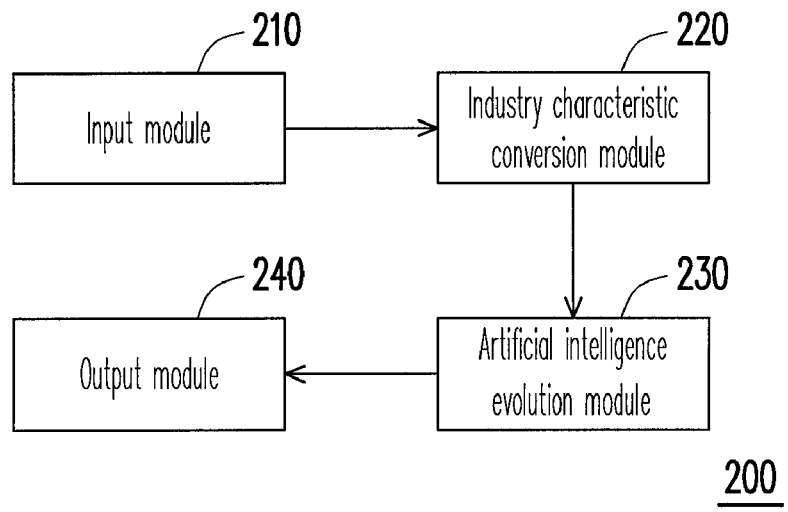
FIG. 2 is a block diagram showing a system for resource allocation of a semiconductor testing industry according to an embodiment of the present invention.

FIG. 2 is a block diagram showing a system for resource allocation of a semiconductor testing industry according to an embodiment of the present invention. Referring to FIG. 2, a resource assigning system 200 includes an input module 210, an industry characteristic conversion module 220, an artificial intelligence evolution module 230 and an output module 240.

The input module 210 is used to receive the order information in the semiconductor testing industry and the production information of the factory. The above production information includes multiple resources (e.g. the testing system, the handlers and the operator), and the order information includes a testing quantity corresponding to the product under the product testing function requirement, and the product function testing requirement is used in cooperation with at least one of the auxiliary resources (as shown in FIG. 1). Here, the input module 210 is, for example, a keyboard, a touch panel or a touch pen. After the input module 210 receives the order information and the production information, the order information and the production information are stored into a database of a storage device, so as to be used subsequently.

The industry characteristic conversion module 220 is used to convert the order information and the production information into a data structure which has the industry characteristic. In detail, after the industry characteristic conversion module 220 converts the order information and the production information into the industry characteristic, the characteristics are converted into planning constraints and corresponding chromosome structures.

The artificial intelligence evolution module 230 is used to execute the genetic algorithm, so as to obtain a set of candidate solutions in the chromosome structures. The total profits of the candidate solutions are calculated, so as to obtain the maximum total profit at the end of the planning horizon under consideration of time value. In other words, the artificial intelligence evolution module 230 uses the Darwinian theory of natural selection and survival of the fittest to perform evolution on the planning solutions.

The industry characteristic conversion module 220 and the artificial intelligence evolution module 230 are, for example, programs written in computer languages and executed by a central processing unit of a computer.

The output module 240 is used to output the best candidate solution corresponding to the maximum final total profit. Here, the output module 240 can be, for example, a monitor.

The following illustrates each step of the method for resource allocation in the semiconductor testing industry in cooperation with the resource assigning system 200.

Figure 3:
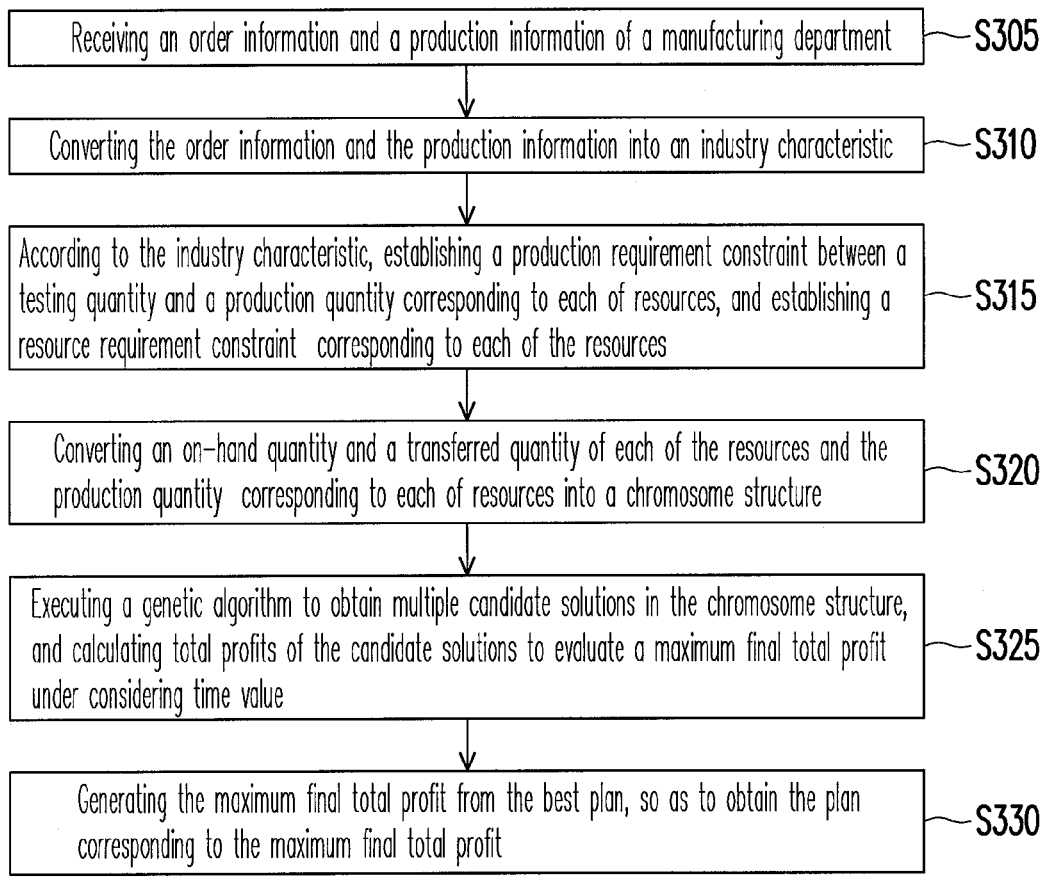
FIG. 3 is a flowchart showing a system for resource allocation in a semiconductor testing industry according to an embodiment of the present invention.

FIG. 3 is a flowchart showing a system for resource allocation in a semiconductor testing industry according to an embodiment of the present invention. Referring to both FIGS. 2 and 3, in the step S305, the order information and the production information of the manufacturing department in the semiconductor testing industry are first received by the input module 210.

Next, in the step S310, the order information and the production information are converted into the industry characteristic by using the industry characteristic conversion module 220. For example, according to the order information and production information, p planning periods, t product testing function requirements and m types of resources are obtained.

Afterwards, in the step S315, the industry characteristic conversion module 220 establishes the production requirement constraints considering the testing quantity, the production quantity, and the relationship between the resources.

In general, the semiconductor testing factory produces the products required in each planning horizon according to customer requirements, and plans the channel for obtaining the resources (including buying, selling, renting and transferring) according to middle and long term resource requirements. According to the resource configuration constraints and the production requirement constraints, the orders that comply with the goals of the firm are selected for production. During planning, decline of machine technology and time value of budgets are also taken into consideration. Accordingly, there is a production requirement constraint between the testing quantity and the production quantity, so as to limit the production quantity to be smaller than or equal to the testing quantity requested in the order. Each of the resources also has a resource configuration constraint, so as to limit a sum of the current resource to be greater than or equal to the quantity required during production.

Then, in the step S320, the industry characteristic conversion module 220 convents the on-hand quantity, the transferred quantity of each of the resources obtained through the channels and the production quantity corresponding to each of the resources into the chromosome structure.

Next, in the step S325, the artificial intelligence evolution module 230 is used to execute the genetic algorithm, so as to obtain a set of candidate solutions (plans). The total profits of the candidate solutions are calculated and evaluated, so as to obtain the plan corresponding to the maximum final total profit from the candidate solutions under consideration of time value. Each of the above candidate solutions (plans) complies with the production requirement constraint and the resource configuration constraint.

In other words, according to results of the industry characteristic conversion module 220, the artificial intelligence module 230 uses the characteristic extracted from the industry to produce the resource planning and capacity allocation plan. The Darwinian theory of natural selection and survival of the fittest is used to perform evolution on the plans until the maximum final total profit of the best plan converges on a value.

Last, in the step S330, the maximum final total profit from the best plan is obtained through the artificial intelligence evolution module 230, so as to obtain the plan corresponding to the maximum final total profit. And, the best plan (including the on-hand quantity, the transferred quantity and the production quantity of each of the resources) is output through the output module 240.

The following examples respectively illustrate each of the industry characteristic conversion module 220 and the artificial intelligence evolution module 230 in detail.

Figure 4:
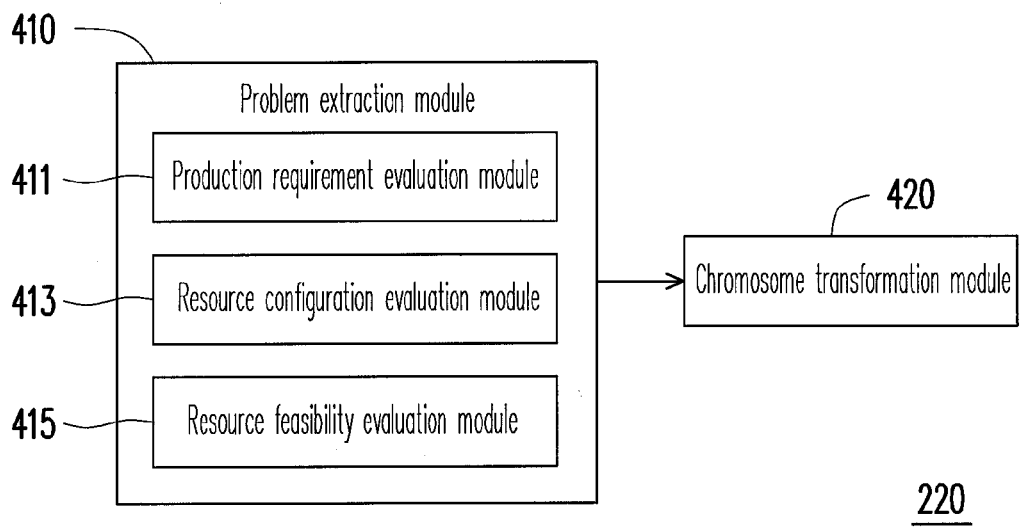
FIG. 4 is a block diagram showing an industry characteristic conversion module according to an embodiment of the present invention.

FIG. 4 is a block diagram showing the industry characteristic conversion module according to an embodiment of the present invention. Referring to FIG. 4 and according to the present embodiment, the industry characteristic conversion module 220 includes a problem extraction module 410 and a chromosome transformation module 420. The problem extraction module 410 includes a production requirement evaluation module 411, a resource configuration evaluation module 413 and a resource feasibility evaluation module 415.

The problem extraction module 410 is used to convert the order information and the production information into the industry characteristic, to establish the production requirement constraint between the testing quantity and the production quantity according to the industry characteristic, and to establish the resource configuration constraint between the resources. For example, according to the order information and the production information, the problem extraction module 410 converts the order information and the production information into the industry characteristic such as the periods of planning horizons, the types of the resource, the number of the product testing function requirement and the channels for obtaining the resources. Next, the problem extraction module 410 establishes the resource configuration constraint and the production requirement constraint according to the industry characteristic.

In the problem extraction module 410, the resource feasibility evaluation module 415 evaluates whether each of the resources can be used in cooperation under the product testing function requirement according to a feasibility parameter. The feasibility parameter of configuration between the resources is, for example, $c_{m,a,t}^{h}$. When the product testing function requirement t can be fulfilled by using the $m^{th}$ type resource (e.g. the testing system) in cooperation with the $h^{th}$ auxiliary resource a (e.g. the handler), $c_{m,a,t}^{h}=1$; otherwise, $c_{m,a,t}^{h}=0$.

Moreover, by using another feasibility parameter, the resource feasibility evaluation module 415 evaluates whether each of the resources can be used to obtain the product under the product testing function requirement. The feasibility parameter of the product testing function requirement t used in cooperation with the $m^{th}$ type resource is, for example, $c_{m,t}$. When the product testing function requirement t can be satisfied using the $m^{th}$ type resource, $c_{m,t}=1$; otherwise, $c_{m,t}=0$.

Under each product testing function requirement, the production requirement evaluation module 411 is used to limit the production quantity corresponding to each of the resources to be smaller than or equal to the required testing quantity, so as to establish the production requirement constraint. The production requirement constraint is, for example:

$$\sum_{m} c_{m,t} Q_{p,m,t} \leq o_{p,t}.$$

The configuration of the resources has to be taken into consideration so that the resources jointly support the production.

$$\sum_{a} c_{m,a,t}^{h} Q_{p,a,m,t}^{h} = Q_{p,m,t}.$$

In the above, p is the index of planning periods, $Q_{p,m,t}$ is the production quantity corresponding to the product testing function requirement t used in cooperation with the $m^{th}$ primary resource in the $p^{th}$ period. $o_{p,t}$ is the testing quantity corresponding to the product testing function requirement t in the $p^{th}$ period.

Based on throughput, working hours and a target utilization rate, and the required resource quantity during production is determined, the resource configuration evaluation module 413 limits a sum of the on-hand quantity and the transferred quantity to be greater than or equal to the quantity required during production under the product testing function requirement, so as to establish the resource configuration constraint. In other words, the resource configuration constraint is used to limit a total quantity of the resources (the on-hand quantity plus the transferred quantity), for example:

$$K_{p,m} + \sum_z X_{p,m,z} \geq \sum_t \frac{c_{m,t} Q_{p,m,t}}{r_{m,t} w_{p,m} y_{p,m}}.$$

$K_{p,m}$ is the on-hand quantity of the $m^{th}$ type primary resource in the $p^{th}$ period, $X_{p,m,z}$ is the transferred quantity of the $m^{th}$ type primary resource obtained from channel z in the $p^{th}$ period, $r_{m,t}$ is the throughput of the $m^{th}$ type resource under the product testing function requirement t, $w_{p,m}$ is the working hours of the $m^{th}$ type resource in the $p^{th}$ period, and $y_{p,m}$ is the target utilization rate of the $m^{th}$ type resource in the $p^{th}$ period.

The chromosome transformation module 420 is used to convert the resource planning and capacity allocation plan into the chromosome structure. The chromosome structure represents a concrete resource planning and capacity allocation plan, and the conversion result includes the present on-hand quantity of the resources during each planning period, the transferred quantity through different channels and the production quantity of the product testing function requirement (i.e. the above-mentioned $K_{p,m}$, $X_{p,m,z}$ and $Q_{p,m,t}$). In other words, the chromosome transformation module 420 converts the planning plan into a multiple-dimensional chromosome structure, so as to provide a format required by the artificial intelligence evolution module 230.

Figure 5:
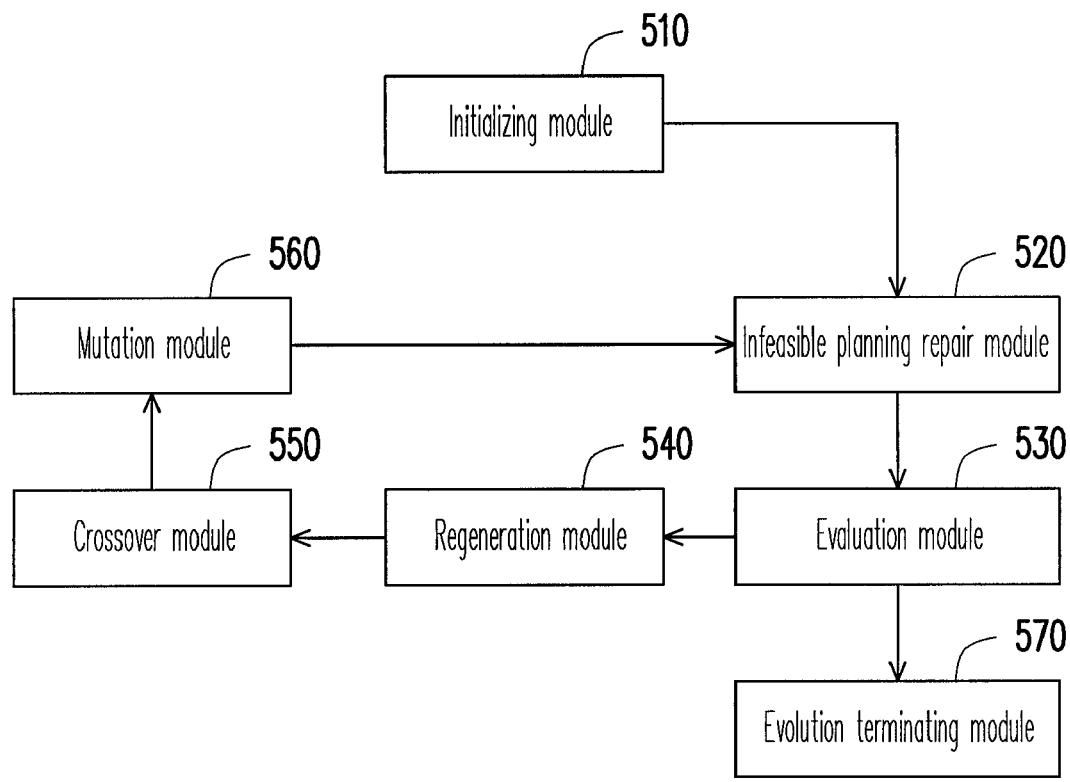
FIG. 5 is a block diagram showing an artificial intelligence evolution module according to an embodiment of the present invention.

The following provides another embodiment to illustrate the artificial intelligence evolution module 230. FIG. 5 is a block diagram showing an artificial intelligence evolution module according to an embodiment of the present invention. Referring to FIG. 5, according to the present embodiment, the artificial intelligence evolution module 230 includes an initializing module 510, an infeasible planning repair module 520, an evaluation module 530, a regeneration module 540, a crossover module 550, a mutation module 560 and an evaluation terminating module 570.

Before executing the artificial intelligence evolution module 230, a decision maker may define the size of the feasible plan population (synchronized evolution), a crossover rate, a mutation rate and an evolution terminating criterion in advance.

The initializing module 510 is used to randomly generate the candidate solutions in the chromosome structure. In other words, the initializing module 510 first randomly generates a set of plans (which are the above-mentioned candidate solutions) for resource planning and capacity allocation of the semiconductor testing factory, and uses the infeasible planning repair module 520 to repair all infeasible planning results into feasible results. Here, the result generated by the module is a set of feasible plans.

The infeasible planning repair module 520 individually evaluates whether the above candidate solutions comply with the production requirement constraint and the resource configuration constraint. When the candidate solutions do not comply with the production requirement constraint or the resource configuration constraint, the infeasible planning repair module 520 randomly selects another candidate solution in the feasible range of the production requirement constraint and the resource configuration constraint.

In general, the artificial intelligence evolution method conventionally processes the infeasible plans during evolution of an optimal plan by using a penalty value method and/or deleting the infeasible plan. Such a method has problems on high complexity and strict constraints, causing low efficiency in solution finding. Hence, the infeasible planning repair module 520 is used to process the infeasible plans and repair them into feasible results. Besides chromosome gene values that violate the feasible solutions, the infeasible planning repair module 520 retains as much evolution information as possible. The following shows an application method thereof.

For example, an original constraint formula (e.g. the production requirement constraint or the resource configuration constraint) is presumed to be 1A+2B≦10. First, an slack variable is added to the original constraint formula, so that the formula is converted into an equation 1A+2B+C=10.

Next, a repair sequence is determined according to the feasible ranges of the variables. In the example above, the feasible range of the variable A is 0 to 10, and the feasible range of the variable B is 0 to 5. Hence, the repair sequence, arranged from strict to loose, is B to A.

Afterwards, whether the constraints are violated is evaluated. A solution provided by the algorithm is presumed to be (A,B)=(9,3). At this moment, the variable not yet evaluated set is: [A,B], the variable to be evaluated set is: [ ], and the variable already evaluated set is: [ ]. Next, B is set as the variable to be evaluated, and whether the constraints are violated is evaluated. At this time, the variable not yet evaluated set is: [A], the variable to be evaluated set is: [B], and the variable already evaluated set is: [ ]. Since 2B≦10, the constraint is not violated, so B=3 does not need to be repaired.

After B is confirmed, the variable B is changed from the variable to be evaluated set into the variable already evaluated set, and A is changed from the variable not yet evaluated set to the variable to be evaluated set. At this moment, the variable not yet evaluated set is: [ ], the variable to be evaluated set is: [A], and the variable already evaluated set is: [B]. Therefore, 6+A≦10. Since the fact that A is 9 violates the constraint (meaning that 6+9 is not smaller than or equal to 10), the feasible range of the solution of A being repaired according to the already determined value of B is 0 to 4, so as to conform to 6+A≦10.

Afterwards, if A is randomly generated to be 3, A is disposed from the variable to be evaluated set to the variable already evaluated set. At this moment, the variable not yet evaluated set is: [ ], the variable to be evaluated set is: [ ], and the variable already evaluated set is: [A, B].

Last, when all the variables have been evaluated, the constraint formula 1A+2B+C=10 turns into 3+6+C=10, so that the slack variable C=1 is obtained.

Referring back to FIG. 5, the evaluation module 530 is used to calculate the total profits of the candidate solutions, so as to evaluate the maximum final total profit corresponding to the candidate solutions. The evaluation module 530 is mainly used to calculate the degree to which all the plans comply with the goal of the firm. To maximize business profits, the evaluation module 530 calculates profits generated by each plan for the semiconductor testing factory.

The regeneration module 540 performs the regeneration evolution using the candidate solutions repaired by the infeasible planning repair module 520. Here, the regeneration module 540 retains the best plan to the end in the process of evolving the plans. According to the fitness degree of the goal of the firm which is evaluated by the evaluation module 530, and by using a method in which the plan that fits more to the goal has a greater chance of being retained, the content of the plan is duplicated to the next iteration.

The crossover module 550 is used to randomly select two candidate solutions in the candidate solutions generated in the regeneration evolution, so as to perform the crossover evolution. This means that the crossover module 550 is used to select the two better plans, and exchanges a part of information of the two plans to attempt to generate a better planning result. An information exchanging method of the crossover module 550 sequentially selects two plans according to a crossover rate, and randomly selects one-point crossover, two-point crossover, uniform crossover, arithmetical crossover, uniform arithmetical crossover and blind crossover operators that are common in artificial intelligence.

The mutation module 560 performs the mutation evolution using the candidate solutions generated by the crossover evolution. In order to depart from conventional plans in hope of finding a better planning result, the mutation module 560 is used according to a mutating rate, so as to randomly generate a replacement value in the feasible range of the production quantity of the plan or of the on-hand quantity of the resources. After the values are replaced, the infeasible planning repair module 520 is used to perform repairing, so as to ensure the plans for resource planning and capacity allocation are feasible, which is ensuring that the candidate solutions generated by the mutation module 560 comply with the production requirement constraint and the resource configuration constraint.

Next, the evaluation module 530 is used to evaluate the candidate solutions generated by the mutation module 560 until the maximum final total profit obtained by the evaluation module 530 converges to a value. When the maximum final total profit obtained by the evaluation module 530 converges to a value, an evolution terminating module 570 terminates evolution and outputs the maximum final total profit and the corresponding plan by the output module 240.

Figure 6:
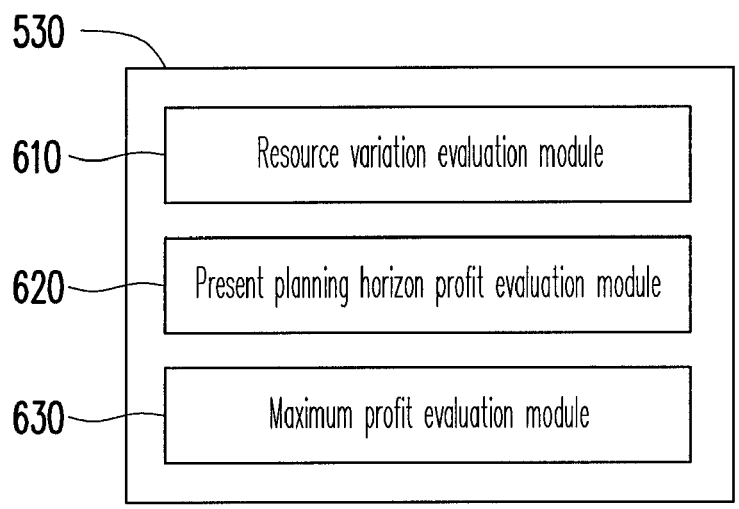
FIG. 6 is a block diagram showing an evaluation module according to an embodiment of the present invention.

For example, FIG. 6 is a block diagram showing an evaluation module according to an embodiment of the present invention. Referring to FIG. 6, the evaluation module 530 includes a resource variation evaluation module 610, a present planning period budget evaluation module 620 and a maximum profit evaluation module 630.

The resource variation evaluation module 610 calculates the resource variation cost of each of the resources using the on-hand quantity of each of the resources in the present planning period and the on-hand quantity of each of the resources in the previous planning period. For example, the resource variation cost is calculated using a following equation.

$$G_{p,m} = \begin{cases} e_{p,m}(K_{p,m} - K_{p-1,m}), & \text{if } K_{p,m} - K_{p-1,m} \geq 0 \\ d_{p,m}(K_{p,m} - K_{p-1,m}), & \text{otherwise.} \end{cases}$$

$d_{p,m}$ is the declined residual value of the $m^{th}$ type resource in the $p^{th}$ period, $e_{p,m}$ is a purchasing cost of the $m^{th}$ type resource in the $p^{th}$ period.

The present planning period budget evaluation module 620 is used to sequentially add the profit of the previous planning period and a production profit of the present planning period under the product testing function requirement, to subtract a transferring cost of transferring each of the resources through the different channels, and to subtract the resource variation cost in the present planning period. In other words, the total profit in the present planning period is affected by the total profit in the previous planning period, the cost of renting or purchasing the resources, and production profits of the resources. According to the present embodiment, the total profit is calculated according to the following equation:

$$F_p = F_{p-1}(1 + I_{p-1}) - \sum_{m,z} u_{p,m,z} X_{p,m,z} - \sum_m G_{p,m} + \sum_{m,t} B_{m,t} Q_{p,m,t}.$$

In the equation, p is the index of the planning periods, $F_p$ is the total profit in the $p^{th}$ period, $F_0$ is the profit in the initial planning horizon, $I_p$ is the interest rate in the $p^{th}$ period, $u_{p,m,z}$ is the transferring cost of obtaining the $m^{th}$ type resource through the channel z in the $p^{th}$ period, $X_{p,m,z}$ is the transferred quantity of obtaining the $m^{th}$ type resource through the channel z in the $p^{th}$ period, $G_{p,m}$ is the resource variation cost of the $m^{th}$ type resource in the $p^{th}$ period, $B_{m,t}$ is the profit obtained by the using the product testing function requirement t in cooperation with the $m^{th}$ type resource, and $Q_{p,m,t}$ is the production quantity corresponding to the product testing function requirement t used in cooperation with the $m^{th}$ type resource in the $p^{th}$ period.

The maximum profit evaluation module 630 calculates the declined residual value according to the on-hand quantity of each of the resources in the last planning period, and the maximum final total profit is obtained as well. The maximum profit evaluation module 630 calculates the maximum final total profit at the end of the planning horizon according to a following equation, for example.

$$\text{MAX} \frac{1}{\prod_p (1 + I_p)} \left[ \sum_m (d_{p^{end},m} K_{p^{end},m}) + F_{p^{end}} \right].$$

Here, p is the index of the planning periods, $F_{p^{end}}$ is the total profit in the previous planning period, $I_p$ is the interest rate in the $p^{th}$ period, $K_{p^{end},m}$ is the on-hand quantity of the $m^{th}$ type resource in the last planning period, and $d_{p^{end},m}$ is the declined residual value of the $m^{th}$ type resource in the last planning period.

In summary, the system and method for resource allocation according to the above embodiment uses the industry characteristic conversion module to precisely describe and convert a problem of multiple resource planning and production capacity allocation in the semiconductor testing industry into the chromosome structure required by the artificial intelligence evolution module. In addition, the industry characteristic conversion module further includes the industry characteristic in the semiconductor testing industry such as multiple resources configuration constraints, production capacity constraints, time value of the resources and profits, and the channels for obtaining the resources.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for resource allocation in a semiconductor testing industry, comprising:
   receiving order information of a product and production information of a manufacturing department in the semiconductor testing industry performed by a computer, wherein the production information comprises multiple resources, the order information comprises a testing quantity corresponding to a product testing function requirement, and the product testing function requirement is fulfilled in cooperation with a primary resource and at least an auxiliary resource;
   converting the order information and the production information into an industry characteristic performed by the computer;
   according to the industry characteristic, establishing a production requirement constraint between the required testing quantity and a production quantity corresponding to each of the resources, and establishing a resource configuration constraint of the resources performed by the computer;
   converting a resource planning and capacity allocation plan into a chromosome structure performed by the computer;
   executing a genetic algorithm to obtain a set of candidate solutions in the chromosome structure and calculating total profits of the candidate solutions performed by the computer, so as to evaluate a maximum final total profit under consideration of time value, wherein the candidate solutions comply with the production requirement constraint and the resource configuration constraint; and
   obtaining the maximum final total profit of all the candidate solutions performed by the computer, so as to obtain the best candidate solution corresponding to the maximum final total profit.

2. The method for resource allocation in the semiconductor testing industry of claim 1, before the step of establishing the production requirement constraint and the resource configuration constraint, further comprising:
   according to a first feasibility parameter, evaluating whether the resources can cooperate with each other auxiliary resources under the product testing function requirement; and
   according to a second feasibility parameter, evaluating whether each of the resources can be used to obtain the product under the product testing function requirement.

3. The method for resource allocation in the semiconductor testing industry of claim 1, wherein the step of establishing the production requirement constraint comprises:
   under the product testing function requirement, limiting the production quantity corresponding to each of the resources to be smaller than or equal to the required testing quantity.

4. The method for resource allocation in the semiconductor testing industry of claim 3, wherein the production requirement constraint comprises:

$$\sum_m c_{m,t} Q_{p,m,t} \le o_{p,t};$$

wherein p is an index of planning periods, $c_{m,t}$ represents whether the $m^{th}$ type resource can be used to obtain the product under a product testing function requirement t, $Q_{p,m,t}$ is a production quantity corresponding to the product testing function requirement t used in cooperation with the $m^{th}$ type resource in the $p^{th}$ period, and $o_{p,t}$ is the testing quantity corresponding to the product testing function requirement t in the $p^{th}$ period.

5. The method for resource allocation in the semiconductor testing industry of claim 1, wherein the step of establishing the resource configuration constraint comprises:
   according to throughput, working hours, a target utilization of each of the resources, determining a production requirement quantity; and
   under the product testing function requirement, limiting a sum of the on-hand quantity and the transferred quantity to be greater than or equal to the production requirement quantity.

6. The method for resource allocation in the semiconductor testing industry of claim 5, wherein the resource configuration constraint comprises:

$$K_{p,m} + \sum_z X_{p,m,z} \ge \sum_t \frac{c_{m,t} Q_{p,m,t}}{r_{m,t} w_{p,m} y_{p,m}};$$

wherein p is an index of planning periods, is an on-hand quantity of the $m^{th}$ type resource in the $p^{th}$ period, $X_{p,m,z}$ is a transferred quantity of the $m^{th}$ type of resource obtained from a channel z in the $p^{th}$ period, $c_{m,t}$ represents whether the $m^{th}$ type resource can be used to obtain the product under the product testing function requirement t, $Q_{p,m,t}$ is a production quantity corresponding to the product testing function requirement t used in cooperation with the $m^{th}$ type resource in the $p^{th}$ period, $r_{m,t}$ is the throughput of the $m^{th}$ type resource in the $p^{th}$ period under the product testing function requirement t, $w_{p,m}$ is the working hours of the $m^{th}$ type resource in the $p^{th}$ period, and $y_{p,m}$ is the target utilization rate of the $m^{th}$ type of resource in the $p^{th}$ period.

7. The method for resource allocation in the semiconductor testing industry of claim 1, wherein the step of calculating the total profits of the candidate solutions comprises:
   in a multiple planning periods under the product testing function requirement, sequentially adding a profit from the previous planning period and a production profit of the present planning period, subtracting a transferring cost of transferring each of the resources through the channel, and subtracting a resource variation cost of the present planning period, so as to obtain a total profit of the present planning period, wherein the resource variation cost is obtained by calculating the on-hand quantity in the present planning period and the quantity in the previous planning period of each of the resources.

8. The method for resource allocation in the semiconductor testing industry of claim 7, wherein the total profits of the candidate solutions are calculated according to a following equation:

$$F_p = F_{p-1}(1 + I_{p-1}) - \sum_{m,z} u_{p,m,z} X_{p,m,z} - \sum_m G_{p,m} + \sum_{m,t} B_{m,t} Q_{p,m,t};$$

wherein p is an index of planning periods, $F_p$ is the total profit in the $p^{th}$ period, $F_0$ is a profit in the initial planning period, $I_p$ is an interest rate in the $p^{th}$ period, $u_{p,m,z}$ is the transferring cost of obtaining the $m^{th}$ type resource through the channel z in the $p^{th}$ period, $X_{p,m,z}$ is the transferred quantity of obtaining the $m^{th}$ type resource through the channel z in the $p^{th}$ period, $G_{p,m}$ is the resource variation cost of the $m^{th}$ type resource in the $p^{th}$ period, $B_{m,t}$ is a profit obtained under the product testing function requirement t in cooperation with the $m^{th}$ type resource, and $Q_{p,m,t}$ is the production quantity corresponding to the product testing function requirement t used in cooperation with the $m^{th}$ type resource in the $p^{th}$ period.

9. The method for resource allocation in the semiconductor testing industry of claim 7, wherein the step of calculating the total profits of the candidate solutions to evaluate the maximum final total profit under consideration of time value comprises:
according to the on-hand quantity of each of the resources in the last planning period, calculating a declined residual value of the resources; and
according to the total profit in the last planning period and the declined residual value, obtaining the maximum final profit at the end of the planning horizons.

10. The method for resource allocation in the semiconductor testing industry of claim 9, wherein the maximum final total profit is evaluated according to a following equation:

$$\text{MAX} \frac{1}{\prod_p (1+I_p)} \left[ \sum_m (d_{p^{end},m} K_{p^{end},m}) + F_{p^{end}} \right];$$

wherein p is an index of planning periods, $F_{p^{end}}$ is a total profit in the last planning period, $I_p$ is an interest rate in the $p^{th}$ period, $K_{p^{end},m}$ is the on-hand quantity of the $m^{th}$ type resource in the last planning period, and $d_{p^{end},m}$ is a declined residual value of the $m^{th}$ type resource in the last planning period.

11. The method for resource allocation of the semiconductor industry of claim 1, wherein the step of executing the genetic algorithm to obtain the candidate solutions in the chromosome structure comprises:
randomly generating initial candidate solutions in the chromosome structure;
individually evaluating whether the candidate solutions comply with the production requirement constraint and the resource configuration constraint;
when one of the candidate solutions does not comply with at least one of the production requirement constraint and the resource configuration constraint, randomly selecting another candidate solution to be the candidate solution in the feasible range of both the production requirement constraint and the resource configuration constraint; and
performing a regeneration evolution, a crossover evolution and a mutation evolution on the candidate solutions, then re-evaluating whether the candidate solutions comply with the production requirement constraint and the resource configuration constraint, and repeatedly performing the above regeneration evolution, crossover evolution and mutation evolution until the maximum final total profit corresponding to the best candidate solutions converges to a value.

12. The method for resource allocation in the semiconductor testing industry of claim 11, wherein the crossover evolution comprises one of a random selecting one-point crossover, a two-point crossover, an uniform crossover, a arithmetical crossover, an uniform arithmetical crossover and a blind crossover operator.

13. A system for resource allocation of a semiconductor testing industry, comprising:
a storage device, storing a plurality of programs written in a computer language; and
a central processing unit, executing the programs;
wherein the programs comprises:
an input module for receiving order information of a product and production information of a manufacturing department in the semiconductor testing industry, wherein the production information comprises multiple resources, the order information comprises a testing quantity corresponding to the product under a product testing function requirement, and the product testing function requirement is fulfilled by a primary resource in cooperation with at least an auxiliary resource;
an industry characteristic conversion module, comprising:
a problem extraction module for converting the order information and the production information into an industry characteristic, establishing a production requirement constraint between the required testing quantity and a production quantity corresponding to each of the resources, and establishing a resource configuration constraint of the resources; and
a chromosome transformation module for converting a resource planning and capacity allocation plan into a chromosome structure;
an artificial intelligence evolution module for executing a genetic algorithm to obtain a set of candidate solutions in the chromosome structure and calculating total profits of the candidate solutions to obtain a maximum final total profit under consideration of time value, wherein the candidate solutions comply with the production requirement constraint and the resource configuration constraint; and
an output module for outputting the candidate solution corresponding to the maximum final total profit.

14. The system for resource allocation in the semiconductor testing industry of claim 13, wherein the problem extraction module comprises:
a production requirement evaluation module for limiting the production quantity corresponding to each of the resources to be smaller than or equal to the testing quantity under the product testing function requirement, so as to establish the production requirement constraint;
a resource requirement evaluation module for limiting a sum of the on-hand quantity and the transferred quantity to be greater than or equal to a production requirement quantity under the product testing function requirement, so as to establish the resource configuration constraint, wherein the production requirement quantity is determined according to throughput, working hours and a target utilization rate of each of the resources.

15. The system for resource allocation in the semiconductor testing industry of claim 13, wherein the problem extraction module further comprises:
a resource configuration evaluation module for evaluating whether the resources can be used in cooperation under the product testing function requirement according to a first feasibility parameter, and evaluating whether each of the resources can be used to obtain the product under the product testing function requirement according to a second feasibility parameter.

16. The system for resource allocation in the semiconductor testing industry of claim 13, wherein the artificial intelligence evolution module comprises:
an initializing module for randomly generating the candidate solutions in the chromosome structure;
an infeasible planning repair module for respectively evaluating whether the candidate solutions comply with production requirement constraint and the resource configuration constraint, so that when one of the candidate solutions does not comply with at least one of the production requirement constraint and the resource configuration constraint, regenerating another candidate solution as the candidate solution in a feasible range of both the production requirement constraint and the resource configuration constraint;

an evaluation module for calculating the total profits of the candidate solutions, so as to evaluate the maximum final total profit corresponding to each of the candidate solutions;

a regeneration module for executing a regeneration evolution using the candidate solution repaired by the infeasible planning repair module;

a crossover module randomly selecting two candidate solutions in the candidate solutions generated in the regeneration evolution, so as to execute the crossover evolution;

a mutation module for executing a mutation evolution using the candidate solutions generated by the crossover evolution, wherein the infeasible planning repair module is used to re-evaluated the candidate solutions generated by the mutation module, so as to ensure that the candidate solutions generated by the mutation module comply with the production requirement constraint and the resource configuration constraint, and the above evolutions are repeatedly performed until the maximum final total profit obtained from the evaluation module converges to a value.

17. The system for resource allocation in the semiconductor testing industry of claim 16, wherein the evaluation module further comprises:
a resource variation evaluation module for calculating a cost variation from the on-hand quantity of the present planning period and the on-hand quantity of the previous planning period;
a present planning period profit evaluation module for sequentially adding a profit from the previous planning period and a production profit of the present planning period under the product testing function requirement, subtracting a transferring cost of transferring each of the resources through the channel, and subtracting the resource variation cost in the present planning period; and
a maximum profit evaluation module for calculating a declined residual value of the on-hand resources according to the on-hand quantity of each of the resources in a last planning period, and evaluating the maximum final total profit according to the total profit and the declined residual value in the last planning period.

18. The system for resource allocation in the semiconductor testing industry of claim 16, wherein the crossover evolution comprises randomly selecting one of a one-point crossover, two-point crossover, uniform crossover, arithmetical crossover, uniform arithmetical crossover and blind crossover operator.

* * * * *